(12) United States Patent
Arzt et al.

(10) Patent No.: US 10,538,613 B2
(45) Date of Patent: Jan. 21, 2020

(54) AQUEOUSLY DISPERSIBLE POLYURETHANE

(75) Inventors: Anton Arzt, Neu-Tillmitsch (AT); Markus Schafheutle, Graz (AT); Gerlinde Petritsch, Graz (AT); Julius Burkl, Graz (AT); Robert Harrer, Graz (AT); Ulrike Kuttler, Vasoldsberg (AT)

(73) Assignee: Allnex Austria GmbH, Werndorf (AT)

( * ) Notice: Subject to any disclaimer, the term of this patent is extended or adjusted under 35 U.S.C. 154(b) by 494 days.

(21) Appl. No.: 13/504,390

(22) PCT Filed: Oct. 27, 2010

(86) PCT No.: PCT/EP2010/066290
§ 371 (c)(1),
(2), (4) Date: Jul. 13, 2012

(87) PCT Pub. No.: WO2011/051359
PCT Pub. Date: May 5, 2011

(65) Prior Publication Data
US 2012/0269974 A1 Oct. 25, 2012

(30) Foreign Application Priority Data
Oct. 27, 2009 (EP) .................................... 09174265

(51) Int. Cl.
*B05D 1/02* (2006.01)
*C08G 18/83* (2006.01)
*C08G 18/42* (2006.01)

(52) U.S. Cl.
CPC ................................ *C08G 18/4238* (2013.01)

(58) Field of Classification Search
CPC ................................................... C09D 175/12
USPC ....................................................... 427/358
See application file for complete search history.

(56) References Cited

U.S. PATENT DOCUMENTS

| | | | |
|---|---|---|---|
| 3,412,054 A | 11/1968 | Milligan et al. | |
| 3,640,924 A | 2/1972 | Hermann et al. | |
| 3,723,372 A | 3/1973 | Wakimoto et al. | |
| 3,920,598 A | 11/1975 | Reiff et al. | |
| 4,240,938 A | 12/1980 | Kraft et al. | |
| 4,314,918 A | 2/1982 | Birkmeyer et al. | |
| 4,543,376 A | 9/1985 | Schupp et al. | |
| 4,885,392 A | 12/1989 | Lenz et al. | |
| 4,983,662 A * | 1/1991 | Overbeek | C08G 18/0823 524/501 |
| 5,334,651 A | 8/1994 | Schwab et al. | |
| 5,342,882 A * | 8/1994 | Gobel | B05D 7/53 427/385.5 |
| 5,473,042 A * | 12/1995 | Brodt | C08G 18/12 528/59 |
| 5,510,444 A * | 4/1996 | Halpaap | C08G 18/3831 428/422.8 |
| 5,554,686 A * | 9/1996 | Frisch, Jr. | C08G 18/0804 524/588 |
| 6,359,060 B1 | 3/2002 | Schafheutle et al. | |
| 2005/0027092 A1* | 2/2005 | Steidl et al. | 528/44 |
| 2009/0264577 A1* | 10/2009 | Blum et al. | 524/501 |
| 2009/0264587 A1 | 10/2009 | Blum et al. | |

FOREIGN PATENT DOCUMENTS

| | | |
|---|---|---|
| CA | 1089140 A1 | 11/1980 |
| DE | 2020905 A1 | 2/1971 |
| DE | 2314513 A1 | 10/1974 |
| DE | 2624442 A1 | 12/1976 |
| DE | 2744544 A1 | 4/1978 |
| DE | 2811913 A1 | 2/1980 |
| DE | 3124784 A1 | 4/1982 |
| DE | 3644371 A1 | 7/1988 |
| EP | 0120466 A1 | 10/1984 |
| GB | 1575637 A | 9/1980 |
| JP | H07-118606 A | 5/1995 |
| JP | H11-92655 A | 4/1999 |
| JP | 2000-226428 A | 8/2000 |
| JP | 2008-303250 A | 12/2008 |

OTHER PUBLICATIONS

International Search Report for PCT/EP2010/066290 dated Feb. 2, 2011.
Office Communication from the Japan Patent Office for Application No. 2012-535817, dated Jun. 30, 2015, and English Language Translation Thereof.

* cited by examiner

*Primary Examiner* — Alexander M Weddle
(74) *Attorney, Agent, or Firm* — Drinker Biddle & Reath LLP

(57) ABSTRACT

The invention relates to an aqueously dispersible polyurethane having a specific amount of substance of hydroxyl groups, —OH, of at least 0.6 mol/kg, and additionally satisfying at least two of the following conditions: a) a degree of branching measured as specific amount of substance of tertiary and/or quaternary aliphatic carbon atoms of from 0.01 mol/kg to 0.5 mol/kg, b) a specific amount of urea groups >N—CO—N< of from 0.8 mol/kg to 2 mol/kg, and c) a specific amount of substance of hydroxyl groups, —OH, of from 1 mol/kg to 4 mol/kg, wherein in each case the specific amount of substance is based on the mass of the polyurethane, a process for the preparation thereof, and a method of use thereof.

15 Claims, No Drawings

AQUEOUSLY DISPERSIBLE POLYURETHANE

CROSS-REFERENCE TO RELATED APPLICATIONS

This application is a national stage application (under 35 U.S.C. § 371) of PCT/EP2010/066290, filed Oct. 27, 2010, which claims benefit of European Application No. 09174265.0, filed Oct. 27, 2009.

BACKGROUND OF THE INVENTION

The invention relates to an aqueously dispersible polyurethane. It further relates to a process of preparation thereof, and a method of use of the dispersion thus prepared.

Aqueous dispersions of polyurethanes have been known, i. a., from U.S. Pat. No. 5,334,651. These polyurethanes are based on reaction products of polyfunctional isocyanates, polyols having a number average molar mass of at least 400 g/mol, and compounds having at least two groups which are reactive towards isocyanate groups, and at least one group capable of anion formation, which are reacted to form an isocyanate-functional prepolymer, and which prepolymer is reacted in a second step with at least one of low molar mass polyols, and compounds which have one active hydrogen atom, or more than one active hydrogen atom wherein these said hydrogen atom differ in reactivity towards isocyanate groups. These polyurethanes are hydroxy-functional at least due to the reaction of the second step, and aqueous dispersions thereof can be cured with isocyanate crosslinking agents to give tough and resilient films.

Coating films prepared from these polyurethanes can still be improved particularly with respect to their hardness and solvent resistance.

DETAILED DESCRIPTION OF THE INVENTION

It has been found in the investigations leading to this invention that a certain combination of the specific amount of substance of hydroxyl groups, of the specific amount of substance of urea groups, and of the degree of branching in the molecules constituting the hydroxy functional polyurethanes provides the desired combination of hardness, as measured by the König method, and solvent resistance, of coating films prepared from the said polyurethanes, and from crosslinkers therefor.

The invention therefore relates to an aqueously dispersible polyurethane having a specific amount of substance of hydroxyl groups, —OH, of at least 0.6 mol/kg, and additionally satisfying at least two of the following conditions:
a) a degree of branching measured as specific amount of substance of tertiary and/or quaternary aliphatic carbon atoms of from 0.01 mol/kg to 0.5 mol/kg,
b) a specific amount of urea groups >N—CO—N< (formula I) of from 0.8 mol/kg to 2 mol/kg, and
c) a specific amount of substance of hydroxyl groups, —OH, of from 1 mol/kg to 4 mol/kg,
wherein in each case the specific amount of substance is based on the mass of the polyurethane.

The tertiary and quaternary carbon atoms are preferably those that carry three (tertiary carbon atom) or four (quaternary carbon atom) alkylene groups which may preferably have from one to twenty carbon atoms, which may be linear, branched or cyclic, and may optionally be substituted, and may optionally comprise ether groups —O—, imino groups —NH— or alkylimino groups —N(Alkyl)- with preferably from one to twenty carbon atoms which alkyl group may be linear, branched or cyclic, thioether groups —S—, or carbonyl groups —CO—, wherein at the other end of these alkylene groups, there is an ester group —O—CO—, or a urethane group —O—CO—NH—. Particularly preferably, these tertiary and quaternary carbon atoms are derived from a trihydric or tetrahydric alcohol, such as trimethylol ethane, trimethylol propane, trimethylol butane, pentaerythritol, di-trimethylol ethane, di-trimethylol propane, and di-trimethylol butane.

In a preferred embodiment, the said aqueously dispersible polyurethane has the properties b) and c).

In a further preferred embodiment, the said aqueously dispersible polyurethane has the properties a), b) and c).

In a further preferred embodiment, the said aqueously dispersible polyurethane has a degree of branching a') measured as specific amount of substance of tertiary and/or quaternary aliphatic carbon atoms, which is more than 0 mol/kg, and not more than 0.5 mol/kg, viz., of from 0.01 mol/kg to 0.49 mol/kg, particularly preferably, from 0.03 mol/kg to 0.45 mol/kg, and especially preferably, from 0.05 mol/kg to 0.40 mol/kg.

In a further preferred embodiment, the said aqueously dispersible polyurethane has the properties a') and b).

In a further preferred embodiment, the said aqueously dispersible polyurethane has the properties a') and c).

In a further preferred embodiment, the said aqueously dispersible polyurethane has the properties a'), b) and c).

In a further preferred embodiment, the said aqueously dispersible polyurethane has a specific amount of substance of acid and/or acid anion groups of from 0.1 mol/kg to 1.8 mol/kg.

In a further preferred embodiment, the said aqueously dispersible polyurethane has a mass fraction of oligo-oxyethylene groups of from 1% to 25%, wherein oligo-oxyethylene groups obey the formula II: —O—(—CH$_2$—CH$_2$—O—)$_n$—CH$_2$—CH$_2$—O—, wherein n is from 1 to 100.

In a further preferred embodiment, the said aqueously dispersible polyurethane has a mass fraction of oligo-oxyethylene groups of from 1% to 25%, wherein the oligo-oxyethylene groups obey the formula II: —O—(—CH$_2$—CH$_2$—O—)$_n$—CH$_2$—CH$_2$—O—, wherein n is from 1 to 100, and a specific amount of substance of acid and/or acid anion groups of from 0.1 mol/kg to 1.8 mol/kg.

In a further preferred embodiment, the said aqueously dispersible polyurethane has a specific amount of substance of basic groups and/or cationic groups of from 0.1 mol/kg to 1.8 mol/kg. It may also comprise both said basic and said oxyethylene groups.

The invention is also directed to a process for the preparation of the aqueously dispersible polyurethane of claim 1, comprising the steps of
(a)—preparing a hydroxy-functional polymer A having a number average molar mass of at least 400 g/mol, and at least two hydroxyl groups per molecule,
(b)—mixing polymer A with either or both of a hydroxy-functional or amino-functional acid B1 which has at least one, and preferably two, hydroxyl or primary or secondary amino groups and at least one acid group, and a polyether B2 which has oligo-oxyethylene groups obeying the formula II

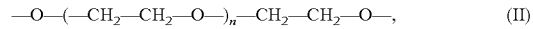

$$—O—(—CH_2—CH_2—O—)_n—CH_2—CH_2—O—, \qquad (II)$$

wherein n is from 1 to 100, and at least one, preferably two hydroxyl groups, or with either or both of a hydroxy-functional or amino-functional basic compound B3 which has at least one, and preferably two, hydroxyl or primary or secondary amino groups and at least one basic group which is preferably a tertiary amino group, and a polyether B2 which has oligo-oxyethylene groups obeying the formula II

wherein n is from 1 to 100, and at least one, preferably two hydroxyl groups, (c)—reacting the mixture prepared in step (b) with at least one polyfunctional isocyanate C having at least two isocyanate groups per molecule, wherein the amount of isocyanate C is chosen such that there is a ratio of isocyanate groups in component C to hydroxyl groups present in the mixture prepared in step (b) of from 2:1 to 1.1:1, until at least 90% of the hydroxyl groups of the mixture prepared in step (b) are consumed by reaction with the isocyanate component C, (d)—adding to the reaction product of step (c) at least one of a hydroxyamine D having at least one primary or secondary amino group, and at least one hydroxyl group, a polyhydric alcohol E having at least two hydroxyl groups per molecule, and a polyfunctional amine F having at least two amino groups, each of the amino groups being selected from primary and secondary amino groups, (e)—dispersing the reaction product of step (d) in water, wherein the amounts of the reactants A, B1, B2, B3, C, D, E, and F are chosen such that the resultant polyurethane has at least two of the properties a), b) and c) as detailed supra.

In a further preferred embodiment, the said process comprises using a hydroxy-functional acid B1 in step (b), and in step (e), the reaction product of step (d) is neutralised before or during or after dispersing in water by adding an alkaline reagent selected from alkali hydroxides, earth alkali hydroxides, amines, ammonium hydroxide and alkylated ammonium hydroxide.

In a further preferred embodiment, the said process comprises using a hydroxy-functional basic compound B3 in step (b), and in step (e), the reaction product of step (d) is neutralised before or during or after dispersing in water by adding an acidic reagent selected from inorganic and organic acids.

In a further preferred embodiment, the said process comprises using a polyhydric organic compound A' having at least three hydroxyl groups per molecule, and a molar mass of not more than 500 g/mol to be added in step (b).

In a further preferred embodiment, the said process comprises using an isocyanate concentration of the reaction product of step (c) of at least 5%.

The invention also relates to a method of use of the said aqueously dispersible polyurethane for the preparation of coating compositions, comprising the steps of admixing to the aqueously dispersible polyurethane at least one additive selected from the group of wetting agents, defoamers, antisettling agents, levelling agents, biocides, and coalescing agents, optionally pigments and colourants, to form a binder mixture, combining the binder mixture thus prepared with at least one crosslinking agent selected from the group consisting of capped and uncapped isocyanates, aminoplast crosslinkers, alkoxycarbonylamino triazines, and phenoplast resins, and applying the mixture of binder and crosslinking agent to a substrate by spraying, dipping, brushing, blade coating, curtain coating or roller coating, and drying the coated substrate optionally at elevated temperature to form a coating film on the said substrate.

Preferably, the range for the degree of branching measured as specific amount of substance of tertiary and/or quaternary aliphatic carbon atoms is from 0.05 mol/kg to 0.4 mol/kg, and the range for the specific amount of urea groups of formula I,

is from 1.0 mol/kg to 1.80 mol/kg, and the range for the specific amount of substance of hydroxyl groups, —OH, is from 1.2 mol/kg to 3.5 mol/kg.

Particularly preferably, the range for the degree of branching measured as specific amount of substance of tertiary and/or quaternary aliphatic carbon atoms is from 0.1 mol/kg to 0.35 mol/kg, and the range for the specific amount of urea groups of formula I, >N—CO—N<, is from 1.0 mol/kg to 1.7 mol/kg, and the range for the specific amount of substance of hydroxyl groups, —OH, is from 1.4 mol/kg to 3.5 mol/kg.

With special emphasis, the range for the degree of branching measured as specific amount of substance of tertiary and/or quaternary aliphatic carbon atoms as defined hereinabove is from 0.2 mol/kg to 0.33 mol/kg, and the range for the specific amount of urea groups of formula I, >N—CO—N<, is from 1.0 mol/kg to 1.8 mol/kg, and the range for the specific amount of substance of hydroxyl groups, —OH, is from 1.4 mol/kg to 3.5 mol/kg.

For all such parameters which relate to the ratio b(X) of the amount of substance n(X) for a particular chemical group X, viz. tertiary or quaternary aliphatic carbon atoms which correspond to the degree of branching, urea groups, or hydroxyl groups, to the mass of the resin, m(Resin), defined by b(X)=n(X)/m(Resin), also referred to as the specific amount of substance, in accordance with DIN 32 625, m(Resin) is the mass of the polyurethane.

The hydroxy-functional polymers A, also referred to as "polyols" hereinafter, have a number average molar mass $M_n$ of at least 400 g/mol, and at least two hydroxyl groups per molecule, and preferably have a number average molar mass $M_n$ of from 500 g/mol to 5000 g/mol, in particular from 800 g/mol to 2000 g/mol. Their hydroxyl number is in general from 30 mg/g to 280 mg/g, preferably from 50 mg/g to 200 mg/g, and in particular from 70 mg/g to 160 mg/g. Examples of such polyols, which are the compounds well known from polyurethane chemistry, are polyether-polyols, polyester-polyols, polycarbonate-polyols, polyesteramide-polyols, polyamido-polyols, epoxy resin polyols and reaction products thereof with $CO_2$, and polyacrylate polyols. Such polyols, which can also be employed as mixtures, are described in, for example, in the patents and patent applications DE 20 20 905 A, DE 23 14 513 C3 and DE 31 24 784 C2, and in EP 0 120 466 A1.

Of these polyols, the polyether- and polyester-polyols are preferred, in particular those which contain only terminal OH groups and have a functionality of less than 3, preferably from 2.8 to 2 and in particular from 2.4 to 2.0. Polyols having a hydroxyl functionality in excess of two are a convenient means to introduce further branching into the resulting polyurethane, where these branches derived from constituents having a functionality or more than two count, of course, in the degree of branching per condition a) of this invention.

Polyether-polyols which may be mentioned here are, for example, polyoxyethylene-polyols, polyoxypropylene-polyols and polyoxybutylene-polyols, and preferably polytetrahydrofurans having terminal OH groups.

The polyester-polyols which are particularly preferred according to the invention are the known polycondensates of di- and optionally poly- (particularly tri-, and tetra-)-ols and di- and optionally poly- (particularly tri-, and tetra-)-carboxylic acids, or hydroxycarboxylic acids or lactones. Instead of the free acids, the corresponding acid anhydrides or corresponding esters of lower alcohols having from one to four carbon atoms can also be used for preparing the polyesters. Examples of suitable diols are ethylene glycol, butylene glycol, diethylene glycol, triethylene glycol, polyalkylene glycols such as polyethylene glycol, and also 1,2- and 1,3-propanediol, 1,2- and 1,4-butanediol, 1,6-hexanediol, neopentyl glycol or neopentyl glycol hydroxypivalate. As polyols which may also be employed, trimethylolpropane, glycerol, erythritol, pentaerythritol, trimethylolbenzene or trishydroxyethyl isocyanurate may be mentioned here by way of example.

Suitable dicarboxylic acids are aromatic and cycloaliphatic dicarboxylic acids and alkyl- and alkenyldicarboxylic acids, and dimeric fatty acids. Examples are: phthalic acid, isophthalic acid, terephthalic acid, tetrahydrophthalic acid, hexahydrophthalic acid, cyclohexane dicarboxylic acid, adipic acid, azelaic acid, sebacic acid, glutaric acid, chlorendic acid, tetra-chloro phthalic acid, maleic acid, fumaric acid, itaconic acid, malonic acid, suberic acid, 2-methylsuccinic acid, 3,3-diethylglutaric acid, 2,2-dimethylsuccinic acid, octenylsuccinic acid and dodecenylsuccinic acid. Anhydrides of these acids, where they exist, can also be used.

Consequently, the anhydrides are included in the term "acid". It is also possible to use small amounts of monocarboxylic acids such as benzoic acid and hexanecarboxylic acid.

Saturated aliphatic or aromatic acids, such as adipic acid or isophthalic acid, are preferred. As a polycarboxylic acid which may be used in smaller amounts, trimellitic acid may be mentioned here, and also polyanhydrides as described in the patent application DE 28 11 913 A1, or mixtures of two or more such compounds.

The hydroxycarboxylic acids which can be used as reactants in the preparation of a polyester-polyol having terminal hydroxyl groups include, for example, hydroxycaproic acid, hydroxybutyric acid, hydroxydecanoic acid, hydroxystearic acid and the like. Lactones which can be used include caprolactone, butyrolactone and the like.

The mass fraction of moieties derived from the polyol component in the polyurethane resin (mass of A used in the synthesis divided by mass of the resin) is usually between 15% and 80%, preferably between 40% and 60%.

The polyhydric organic compounds A' having at least three hydroxyl groups per molecule are preferably aliphatic alcohols having from 3 to 20 carbon atoms, such as glycerol, trimethylol ethane, trimethylol propane, trimethylol butane, pentaerythritol, and sugar alcohols such as mannitol and sorbitol, and ether alcohols such as diglycerol, ditrimethylolpropane, and dipentaerythritol. The introduction of tri- or polyhydric alcohols is a convenient means of increasing the hydroxyl number of the polyurethane resin.

The hydroxy-functional or amino-functional acids B1 which have at least one, and preferably two, hydroxyl or amino groups and at least one acid group, are described, for example, in U.S. Pat. Nos. 3,412,054 and 3,640,924 and in the DE patent 26 24 442 B2 and the DE patent application 27 44 544 A1, to which reference is made here. Polyols, preferably diols, which are particularly suitable in this respect are those having at least one carboxyl group and in general from 1 to 3 carboxyl groups per molecule. Suitable groups capable of anion formation also include sulphonic acid groups. Examples of such compounds are dihydroxycarboxylic acids, such as α,α-dialkylolalkanoic acids, in particular α,α-dimethylolalkanoic acids, such as 2,2-dimethylolacetic acid, 2,2-dimethylolpropionic acid, 2,2-dimethylolbutyric acid, 2,2-dimethylolpentanoic acid, tartaric acids, and also polyhydroxy acids, such as gluconic acid. Particularly preferred among these are 2,2-dimethylolpropionic and 2,2-dimethylolbutyric acids. Examples of compounds B1 containing amino groups are α,δ-diaminovaleric acid, and 2,4-diaminotoluene-5-sulphonic acid. It is also possible to employ mixtures of these compounds B1. The mass fraction of component B1 in the polyurethane resin (mass of B1 used in the synthesis divided by mass of the resin) is in general from 2% to 20%, preferably from 4% to 10%.

The polyethers B2 have oligo-oxyethylene groups obeying the formula II

$$-O-(-CH_2-CH_2-O-)_n-CH_2-CH_2-O-, \quad \text{(II)}$$

wherein n is from 1 to 100, and at least one, preferably two hydroxyl groups, comprise lateral or terminal oxyethylene groups of the formula II supra, and are incorporated into the polyurethane resin by reaction of an at least monovalent alcohol or an at least monovalent amine comprising the structure of the formula II supra with an isocyanate group present in the reaction mixture. Preferably, the mass fraction of compounds B2 used in the synthesis is chosen such that the mass fraction of groups of formula II in the polyurethane resin is at least 1%, preferably at least 3%. The mass fraction of these groups of formula II should however not exceed 10%, and preferably, not 7%, as the water and humidity resistance would then be adversely affected. The lower range of mass fractions of components B1 and B2 is preferably used if both are present.

The polyfunctional isocyanates C having at least two isocyanate groups per molecule are selected from the group consisting of diisocyanates, isocyanates having three or more isocyanate groups, and also, isocyanurates, biurets, allophanates, and uretdiones derived from any of these di- or polyfunctional isocyanates. The diisocyanates which are suitable are compounds which are known in the polyurethane and paints sector, such as aliphatic, cycloaliphatic or aromatic diisocyanates. These are preferably of the formula $Q(NCO)_2$, where Q is a divalent hydrocarbon radical having from 4 to 40 carbon atoms, in particular from 4 to 20 carbon atoms and is preferably an aliphatic hydrocarbon radical having from 4 to 12 carbon atoms, a cycloaliphatic hydrocarbon radical having from 6 to 15 carbon atoms, an aromatic hydrocarbon radical having from 6 to 15 carbon atoms, or an araliphatic hydrocarbon radical having from 7 to 15 carbon atoms. Examples of such diisocyanates which are to be employed with preference are tetramethylene diisocyanate, hexamethylene diisocyanate, dodecamethylene diisocyanate, 1,4-diisocyanatocyclohexane, 3-isocyanatomethyl-3,5,5-trimethylcyclohexyl isocyanate (isophorone diisocyanate), 4,4'-diisocyanatodicyclohexylmethane, 2,2-(4,4'-diisocyanato)dicyclohexylpropane, 1,4-diisocyanatobenzene, 2,4- or 2,6-diisocyanatotoluene or mixtures of these isomers, 4,4'- or 2,4'-diisocyanatodiphenylmethane, 2,2-(4,4'-diisocyanato)diphenylpropane, p-xylylene diisocyanate and α,α,α',α'-tetramethyl-m- or -p-xylylene diisocyanate, and mixtures comprising these compounds.

The hydroxyamines D having at least one primary or secondary amino group, and at least one hydroxyl group, are aliphatic compounds having one or more primary amino groups and one or more primary hydroxyl groups, one or more secondary amino groups and one or more primary hydroxyl groups, one or more primary amino groups and one or more secondary or tertiary hydroxyl groups, or one or more secondary amino groups and one or more secondary or tertiary hydroxyl groups. It is also possible to use hydroxyamines that have hydroxyl groups and both primary and secondary amino groups. Particularly preferred are ethanolamine, N-aminoethylethanolamine, diethanolamine, 4-hydroxymethylpiperidine, 2-hydroxypropylamine, 3-aminopropanol, N,N-bis-(2-hydroxypropyl)amine(diisopropanolamine), N,N'-bis-(2-hydroxyethyl)ethylene diamine, neopentanolamine and particularly preferably diethanolamine.

The polyhydric alcohols E having at least two hydroxyl groups per molecule, and a molar mass of less than 400 g/mol are selected from dihydric aliphatic alcohols having from 2 to 40 carbon atoms, such as ethylene glycol, 1,2- and 1,3-propane diol, 1,2- and 1,4-butane diol, glycerol, trimethylol propane, pentaerythritol, diglycerol, ditrimethylol propane, and dipentaerythritol, and dimeric fatty alcohols. The introduction of tri- or polyhydric alcohols is a convenient means of increasing the hydroxyl number of the polyurethane resin.

The polyfunctional amines F having at least two amino groups, where preferably at least two amino hydrogen atoms have different reactivity, being derived from either a primary, or a secondary amino group. Particularly useful compounds include amines such as the primary/secondary amines 3-amino-1-methylaminopropane, 3-amino-1-ethylaminopropane, 3-amino-1-cyclohexylaminopropane and 3-amino-1-methylaminobutane.

Optionally, the polyurethane resin according to the invention can optionally contain small amounts of components G, which are derived from so-called chain extenders. These compounds include those known in this context which are reactive with isocyanate groups and are preferably at least difunctional with regard to isocyanate functional reactants. Examples of these are water, hydrazine and derivatives thereof, diamines and polyamines such as ethylenediamine, diethylene triamine, triethylene tetramine, tetraethylene pentamine, 1,2- and 1,3-diaminopropane, isophorone diamine, 2- and 3-methylpentane diamine, and hexamethylene diamine, which may also carry further substituents such as hydroxyl groups. Such polyamines are described in the German patent application DE 36 44 371 A1. The mass fraction of moieties derived from this component G in the polyurethane resin is usually between 1% and 10%, preferably between 2% and 5%. These chain extenders G may also comprise the molecules mentioned as components F and differ from these at least inasmuch as are added in the last step e) of the process to the isocyanate functional reaction product of step d).

The preparation of the polyurethane resin employed in accordance with the invention is preferably carried out by first preparing a polyurethane prepolymer from the polyisocyanates C, the polyols A, and the compounds B1 and/or B2, this prepolymer having on average at least 1.7, preferably from 2 to 2.5, free isocyanate groups per molecule and then being reacted in a non-aqueous system which may be in the melt, or dissolved in an organic solvent which may later be removed, with at least one of hydroxyamines D, polyhydric alcohols E, and polyfunctional amines F, under consumption of the remaining isocyanate groups, optionally neutralising the fully reacted polyurethane resin and transferring it to an aqueous system. The solvent used has to be chosen such that it does not react with isocyanate functional compounds. If desired, the reaction with the chain extender G can be carried out either in the solvent or melt, or can also be carried out after transfer to the aqueous system. It goes without saying that a part of the chain extender may also be added before, and the rest after transfer to the aqueous phase.

The preparation of the polyurethane prepolymer is carried out according to known processes. The polyisocyanate is employed in excess relative to the hydroxy functional components to result in a product having free isocyanate groups. These isocyanate groups are terminal and/or lateral, preferably terminal. It is expedient for the amount of polyisocyanate to be such that the ratio of the amounts of substance of isocyanate groups to the amount of substance of hydroxyl groups in the hydroxy functional components is from 1.05 mol/mol to 2 mol/mol, preferably from 1.2 mol/mol to 1.9 mol/mol.

In the preparation of the prepolymer, the reaction is normally carried out at temperatures of from 60° C. to 140° C., preferably from 100° C. to 130° C., depending on the reactivity of the isocyanate employed, and as a rule in the absence of a catalyst but optionally in the presence of solvents which are inert toward isocyanates. In the case of using solvents, the temperatures mentioned supra may be chosen lower, depending on the reactivity of the isocyanate selected. Suitable solvents in this respect are in particular those which are compatible with water, such as ethers, ketones and esters, and also N-methylpyrrolidone or N-ethylpyrrolidone. The amount of this solvent should expediently not exceed a mass fraction of 20% in the solution of the resin or its educts or starting materials, and is preferably in the range from 5% to 15%. It is expedient to add the polyisocyanate to the solution of the remaining components. However it is also possible first to add the polyisocyanate C to the polyol component A and react the resulting prepolymer with component D, in the melt or dissolved in a solvent which is inactive towards isocyanates and is preferably a pyrrolidone derivative or a ketone.

The prepolymer or its solution is then reacted with one or more of components E, F, and G, the temperature expediently being in the range from 50° C. to 110° C., preferably between 70° C. and 110° C., until the NCO content in the prepolymer has fallen virtually to zero. If a chain extender G is used, it has proved to be advantageous to add at least a part of the chain extender only in the aqueous phase as this helps to keep the viscosity down and manageable, if the reaction is conducted in the melt. If compound E is employed, it is added in excess. In this case the amount of E is preferably such that the ratio of the amount of substance of isocyanate groups in the prepolymer, already reacted beforehand if appropriate with compounds F and/or G, to reactive groups in E is 1:1.1 to 1:5. The mass ratio of F and/or G here can be from 0% to 90%, preferably from 0.5% to 20%, of the mass of E.

It is also possible to react a portion of the (non-neutralised) acid groups which may be present in the polyurethane resin if compounds according to B1 are used, preferably from 5% to 30% of these acid groups, with difunctional compounds which react with acid groups, such as diepoxides.

To neutralise the resulting product which preferably contains COOH groups as acid groups if compounds B1 are used, tertiary amines are particularly suitable, for example trialkylamines having from 1 to 12, preferably from 1 to 6 carbon atoms in each alkyl radical. Examples of these compounds are trimethylamine, triethylamine, methyldiethylamine, 2-(N,N-dimethylamino)-2-methyl-propanol-1, and tripropylamine. The alkyl radicals can also contain, for example, hydroxyl groups, as in the case of the dialkylmonoalkanolamines, alkyldialkanolamines and trialkanolamines. An example of such a compound is dimethylethanolamine, which is used preferably as the neutralising agent.

Neutralising agents which can be employed also include, if appropriate, inorganic bases such as ammonia, or sodium or potassium hydroxide.

The neutralising agent is usually employed in a molar ratio with regard to the acid groups of the prepolymer of about 0.3 mol:1 mol to 1.3 mol:1 mol, preferably from about 0.5 mol:1 mol to 1 mol:1 mol.

To neutralise the resulting product which preferably contains tertiary amino groups as basic groups if compounds B3 are used, inorganic acids such as nitric acid, sulfuric acid, or phosphoric acid may be used, or more preferred, volatile organic acids such as acetic acid and formic acid, or still more preferably acids that decompose upon heating such as acetoacetic acid.

The neutralising agent is usually employed in a molar ratio with regard to the basic groups of the prepolymer of about 0.3 mol:1 mol to 1.3 mol:1 mol, preferably from about 0.5 mol:1 mol to 1 mol:1 mol.

Neutralisation which is usually carried out at between room temperature and 110° C. can be performed in any desired manner, for example by adding the water-containing neutralising agent to the polyurethane resin or vice versa. However, it is also possible first to add the neutralising agents to the polyurethane resin and only then to add the water. In general this results in a mass fraction of solids of from 20% to 70%, preferably from 30% to 50%.

The mass fraction of polyurethane resin in the final aqueous coating preparation additionally comprising additives, pigments, fillers, extenders, crosslinkers, etc. is in general from 5% to 40%, preferably from 15% to 30%.

The resulting polyurethane dispersions may be used as binders in coating compositions together with crosslinking components, where the so-called one pack coating compositions comprise crosslinking components that do not, or at least not to a large extent, react with the hydroxy-functional polyurethane at ambient conditions, viz. at room temperature or slightly elevated temperature of not more than 60° C. Such crosslinking components are blocked or capped isocyanates, both of which isocyanates may also be hydrophilically modified, or aminoplast resins, particularly melamine-formaldehyde resins or other triazine-derived resins, phenoplast resins such as phenol or cresol formaldehyde resins, or alkoxycarbonylamino triazines, and mixtures of these. Polyfunctional isocyanates having free isocyanate groups react with the hydroxy-functional polyurethanes already at room temperature, and may therefore only be mixed with the hydroxy-functional polyurethane immediately before use, such mixtures being referred to as two-pack coating compositions. These crosslinking components, and the one-pack or two-pack coating compositions are amply described in the art.

They may also contain additional constituents, such as further hydroxy functional binder resins which serve to modify the application properties of the coating compositions prepared therewith, such as elasticity and gloss.

The resulting coating compositions comprising the aqueously dispersible polyurethane according to the invention are suitable for practically all those areas of application in which solvent-containing, solvent-free or other kinds of aqueous coating systems having an enhanced profile of properties are currently used; the substrates to be coated may consist, for example, of metal, mineral construction materials such as concrete, cement or gypsum, fibre-reinforced concrete construction materials, timber or wooden materials, paper, cardboard, asphalt, bitumen, plastics of various kinds, textiles or leather.

The invention is further illustrated in the following examples which are not to be construed as limiting.

The following parameters were used:

The acid number is defined, according to DIN EN ISO 3682 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g".

The hydroxyl number is defined according to DIN EN ISO 4629 (DIN 53 240) as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g".

Concentrations are generally (unless otherwise stated) mass fractions, i.e. the ratio of the mass $m_B$ of the constituent B in question to the mass m of the mixture, and are usually stated in %, or cg/g. Isocyanate concentration, therefore, is mass of isocyanate groups (—N═C═O, molar mass 42.02 g/mol) present in a mixture, divided by the mass of that mixture, and is measured in accordance with DIN EN ISO 11 909.

Specific amount b(X) of substance of a constituent or functional group (amount of substance n(X) of a constituent or functional group in a mixture, divided by the mass m of the mixture, here for urea groups >N—CO—N<, hydroxyl groups —OH, or branches which are here tertiary or quaternary aliphatic carbon atoms) is referred to as "content" for simplicity, and usually measured in mmol/g or the ratio of SI basic units, mol/kg, showing the same numerical value.

EXAMPLE 1

Preparation of Polyester A

A mixture of 1180 g of 1,6-hexane diol and 1165 g of adipic acid were charged, 280 g of xylene was admixed, and the mixture was heated to 220° C. Water formed in the reaction was distilled off via formation of an azeotrope with xylene. After reaching the theoretical amount of water (287 g) and an acid number of less than 3 mg/g, the azeotrope former was distilled off under reduced pressure, and the remaining polyester was cooled to ambient temperature.

In the residue, the mass fraction of solids was 100%, and the hydroxyl number was 110 mg/g.

EXAMPLE 2

Preparation of Polyester B

A mixture of 1180 g of 1,6-hexane diol and 1318 g of adipic acid were charged, 280 g of xylene was admixed, and the mixture was heated to 220° C. Water formed in the reaction was distilled off via formation of an azeotrope with xylene. After reaching the theoretical amount of water (325 g) and an acid number of less than 3 mg/g, the azeotrope former was distilled off under reduced pressure, and the remaining polyester was cooled to ambient temperature.

In the residue, the mass fraction of solids was 100%, and the hydroxyl number was 50 mg/g.

EXAMPLE 3

Polyurethane Dispersion

A mixture of 1020 g of polyester A of example 1 and 140.7 g of α,α-dimethylolpropionic acid was heated to 60°

C. with stirring. 875.4 g of m-tetramethylxylylene diisocyanate were added to this mixture, and the resulting mixture was stirred and heated to 120° C. At that temperature the reaction was continued until the isocyanate concentration was below 6.4%. The mixture was cooled to 90° C. and 295 g of diethanolamine were added. The reaction mass was heated via exothermy to 130° C., after stirring one hour at this temperature, the mixture was cooled to 100° C. At 100° C., a mixture of 93.5 g of N,N-dimethylethanolamine and 300 g of water were added, and the resulting mixture was stirred for thirty minutes. Immediately thereafter, the reaction mass was dispersed by addition of 3103.1 g of distilled water at 80° C. and stirred for one hour. The following parameters were determined on this dispersion:
Urea Content: 1.166 mmol/g
OH Content: 2.332 mmol/g
Mass Fraction of Solids: 40.6%
Acid Number: 26.1 mg/g
pH: 7.5 (measured on an aqueous dispersion of resin having a concentration of 10%)

EXAMPLE 4

Polyurethane Dispersion

A mixture of 89.9 g of polyester B of example 2, 6.03 g of trimethylolpropane, and 10.05 parts of α,α-dimethylolpropionic acid was heated to 60° C. with stirring. 78 g of m-tetramethyl-xylylene diisocyanate were added to this mixture, and the resulting mixture was stirred and heated to 120° C. At that temperature the reaction was continued until the isocyanate concentration was less than 6.3%. The mixture was cooled to 90° C., and 27 g of diethanolamine were added. The reaction mass was heated via exothermy to 130° C., after stirring one hour at this temperature, the mixture was cooled to 100° C. At 100° C., a mixture of 5.3 g of N,N-dimethylethanolamine and 50 g of water were added, and the resulting mixture was stirred for thirty minutes. Immediately thereafter, the reaction mass was dispersed by addition of 261.8 g of distilled water at 80° C. and stirred for one hour. The following parameters were determined on this dispersion:
Urea Content: 1.225 mmol/g
OH Content: 2.449 mmol/g
Branching: 0.214 mmol/g
Mass Fraction of Solids: 39%
Acid Number: 21.2 mg/g
pH: 7.6 (measured as detailed supra)

EXAMPLE 5

Polyurethane Dispersion

A mixture of 1020 g of a hydroxyfunctional polycarbonate based on 1,6-hexane diol (OH number: 110 mg/g; commercially obtainable as Desmophen® XP 2586, Bayer Material Science AG), and 134.1 g of α,α-dimethylolpropionic acid was heated to 60° C. with stirring. 732.9 g of m-tetramethylxylylene diisocyanate were added and the resulting mixture was stirred and heated to 120° C. At that temperature the reaction was continued until the isocyanate concentration was less than 4.45%. The mixture was cooled to 90° C. and 210 g of diethanolamine was added. 71.3 g of N,N-dimethylethanolamine and 300 g of water were added, and the resulting mixture was stirred for thirty minutes. Immediately thereafter, the reaction mass was dispersed by addition of 2774.65 g of distilled water at 80° C. and stirred for one hour. The following parameters were determined on this dispersion:
Urea Content: 0.922 mmol/g
OH Content: 1.844 mmol/g
Mass Fraction of Solids: 38.4%
Acid Number: 28 mg/g
pH: 8.4 (measured as detailed supra)

EXAMPLE 6

Polyurethane Dispersion

A mixture of 1020 g of a hydroxyfunctional polycarbonate based on 1,6-hexane diol (OH number: 110 mg/g; commercially obtainable as Desmophen® XP 2586, Bayer Material Science AG), and 59 g of α,α-dimethylolpropionic acid was heated to 60° C. with stirring. 614.9 g of m-tetramethylxylylene diisocyanate were added, and the resulting mixture was stirred and heated to 120° C. At that temperature the reaction was continued until the isocyanate concentration was less than 5.4%. The mixture was cooled to 90° C., and a mixture of 139.7 g of diethanolamine, 39.2 g of N,N-dimethylethanolamine, and 2272.9 g of distilled water was added. This mixture was stirred for five minutes. Immediately thereafter, a mixture of 25.7 g of 1,5-methylpentanediamine and 459 g of distilled water were added, and stirred at 60° C. for one hour. The following parameters were determined on this dispersion:
Urea Content: 0.922 mmol/g
OH Content: 1.844 mmol/g
Mass Fraction of Solids: 40.3%
Acid Number: 13.8 mg/g
pH: 8.4 (measured as detailed supra)

EXAMPLE 7

Polyurethane Dispersion

A mixture of 1020 g of a hydroxyfunctional polycarbonate based on 1,6-hexane diol (OH number: 110 mg/g; commercially obtainable as Desmophen® XP 2586, Bayer Material Science AG), 218.4 g of α,α-dimethylolpropionic acid, and 134 g of trimethylol propane was heated to 60° C. with stirring. 1763.5 g of m-tetramethylxylylene diisocyanate were added, and the resulting mixture was stirred and heated to 120° C. At that temperature the reaction was continued until the isocyanate concentration was less than 8.3%. The mixture was cooled to 90° C., and a mixture of 309.5 g of diethanolamine and 179.8 g of ethanolamine was added. 145.2 g of N,N-dimethylethanolamine were then added, and the mixture was stirred for thirty minutes. Immediately thereafter, the reaction mass was dispersed with 5292.7 g of distilled water at 80° C. and stirred for one hour. The following parameters were determined on this dispersion:
Urea Content: 1.643 mmol/g
OH Content: 2.464 mmol/g
Branching: 0.265 mmol/g
mass fraction of solids: 39.7%
Acid Number: 26.3 mg/g
pH: 7.9 (measured as detailed supra)

EXAMPLE 8

Polyurethane Dispersion

A mixture of 1020 g of the polyester A of example 1, 223.8 g of α,α-dimethylolpropionic acid, and 134 g of trimethylolpropane was heated to 60° C. with stirring. 1780.6 g of m-tetramethylxylylene diisocyanate were added, and the resulting mixture was stirred and heated to 120° C. At that temperature the reaction was continued until the isocyanate concentration was less than 8.3%. The mixture was cooled to 90° C., and a mixture of 461.7 g of diethanolamine, 148.7 g of N,N-dimethylethanolamine and 5086.7 g of distilled water was added. This mixture was stirred for five minutes. Immediately thereafter, a mixture of 85 g of 1,5-methylpentanediamine and 650 g of distilled water was added, and the resulting mixture was stirred at 60° C. for one hour. The following parameters were determined on this dispersion:
Urea Content: 1.619 mmol/g
OH Content: 2.427 mmol/g
Branching: 0.259 mmol/g
Mass Fraction of Solids: 38.7%
Acid Number: 26.2 mg/g
pH: 7.9 (measured as detailed supra)

EXAMPLE 9

Comparative Polyurethane Dispersion

A mixture of 22.9 g of the polyester A of example 1, 3.58 g of α,α-dimethylolpropionic acid and 5.3 g of N-ethyl-2-pyrrolidone was heated to 60° C. with stirring. 12.5 g of isophorone diisocyanate were added, and the resulting mixture was stirred and heated to 80° C. At that temperature the reaction was continued until the isocyanate concentration was less than 1.55%. 1.4 g of diethanolamine were added, and the resulting mixture was stirred for 30 minutes, whereafter 2.08 g of N,N-dimethylethanolamine and 53.2 g of distilled water were added. The dispersion formed was stirred at 60° C. for one hour. The following parameters were determined on this dispersion:
Urea Content: 0.31 mmol/g
OH Content: 0.624 mmol/g
Mass Fraction of Solids: 39.4%
Acid Number: 38.3 mg/g
pH: 7.9 (measured as detailed supra)

EXAMPLE 10

Polyurethane Dispersion

A mixture of 1020 g of the polyester A of example 1, 92.5 g of α,α-dimethylolpropionic acid, and 134 g of trimethylolpropane was heated to 60° C. with stirring. 1362.1 g of m-tetramethylxylylene diisocyanate were added, and the resulting mixture was stirred and heated to 120° C. At that temperature the reaction was continued until the isocyanate concentration was less than 7.7%. The prepolymer formed was cooled to 90° C., and a mixture of 188.4 g of diethanolamine, 61.4 g of N,N-dimethylethanolamine, 109.5 g of ethanolamine, and 3855.9 g of distilled water was added. The mixture formed was stirred for five minutes. Immediately thereafter, a mixture of 69.4 g of 1,5-methylpentane diamine and 700 g of distilled water were added, and the dispersion formed was stirred at 60° C. for one hour. The following parameters were determined on this dispersion:
Urea Content: 1.577 mmol/g
OH Content: 1.774 mmol/g
Branching: 0.329 mmol/g
Mass Fraction of Solids: 38.6%
Acid Number: 13.7 mg/g
pH: 8.3 (measured as detailed supra)

EXAMPLE 11

Comparative Polyurethane Dispersion

A mixture of 1020 g of the polyester A of example 1, and 140.7 g of α,α-dimethylolpropionic acid was heated to 60° C. with stirring. 875.4 g of m-tetramethylxylylene diisocyanate were added, and the resulting mixture was stirred and heated to 120° C. At that temperature the reaction was continued until the isocyanate concentration was less than 6.4%. The mixture was cooled to 90° C., and 108 g of diethanolamine and 248.2 g of trimethylolpropane were added. The reaction mass was heated via exothermy to 120° C., after stirring one hour at this temperature, the mixture was cooled to 100° C. At 100° C., a mixture of 93.5 g of N,N-dimethylethanolamine and 300 g of water were added, and the reaction mass was stirred for thirty minutes. Immediately thereafter, the polymer formed was dispersed with 3103.1 g of distilled water at 80° C. and the dispersion was stirred for one hour. The following parameters were determined on this dispersion:
Urea Content: 0.414 mmol/g
OH Content: 2.318 mmol/g
Mass Fraction of Solids: 40.1%
Acid Number: 26.1 mg/g
pH: 7.8 (measured as detailed supra)

EXAMPLE 12

Comparative Polyurethane Dispersion

A mixture of 1020 g of the polyester of example 1, and 134.1 g of α,α-dimethylolpropionic acid was heated to 60° C. with stirring. 1010 g of m-tetramethylxylylene diisocyanate was added, and the resulting mixture was stirred and heated to 120° C. At that temperature the reaction was continued until the isocyanate concentration was less than 8.3%. The mixture was cooled to 90° C., and 109.5 g of ethanolamine and 293 g of dibutylamine were added. The reaction mass was heated via exothermy to 130° C., after stirring one hour at this temperature, the mixture was cooled to 100° C. At 100° C., a mixture of 84.7 g of N,N-dimethylethanolamine and 300 g of water was added to the polymer formed. The reaction product was then dispersed with 3676 g of distilled water at 80° C. and stirred for one hour. The following parameters were determined on this dispersion:
Urea Content: 1.533 mmol/g
OH Content: 0.677 mmol/g
mass fraction of solids: 39.1%
Acid number: 22.3 mg/g
pH: 7.6 (measured as detailed supra)

EXAMPLE 13

Polyurethane Dispersion

A mixture of 1020 g of the polyester A of example 1, and 134.1 g of α,α-dimethylolpropionic acid was heated to 60° C. with stirring. 980 g of m-tetramethylxylylene diisocyanate were added, and the resulting mixture was stirred and heated to 120° C. At that temperature the reaction was continued until the isocyanate concentration was less than 7.9%. The mixture was cooled to 90° C., and 262.5 g of diethanolamine and 178 g of trimethylolpropane were added. The reaction mass was heated via exothermy to 125° C., after stirring one hour at this temperature, the mixture was cooled to 100° C. At 100° C., a mixture of 84.7 g of N,N-dimethylethanolamine and 300 g of water was added, and the mixture was stirred for thirty minutes. Immediately thereafter, the polymer formed was dispersed with 3689 g of distilled water at 80° C. and stirred for one hour. The following parameters were determined on this dispersion:

Acetone resistance was determined by applying a cotton pad soaked with acetone onto the costing film surface, and testing after defined periods of time the treated part of the coating film for its scratch resistance by rubbing the coating film surface using slight pressure on the said cotton pad. The time stated is when the surface of the coating film showed the first sign of being affected. The results are compiled in the following table:

TABLE 1

Test results

| Polyurethane Dispersion of Example | Degree of branching (calculated) in mol/kg | specific amount of substance of urea groups in mol/kg | specific amount of substance of hydroxyl groups in mol/kg | König Hardness in s | Acetone Resistance in min |
|---|---|---|---|---|---|
| 3 | 0 | 1.166 | 2.332 | 106 | 1.5 |
| 4 | 0.214 | 1.225 | 2.449 | 130 | 2 |
| 5 | 0 | 0.922 | 1.844 | 100 | 0.5 |
| 6 | 0 | 0.933 | 1.4 | 66 | 0.5 |
| 7 | 0.265 | 1.643 | 2.464 | 151 | 4 |
| 8 | 0.259 | 1.619 | 2.427 | 160 | 5 |
| 9 | 0 | 0.31 | 0.624 | 40 | <0.1 |
| 10 | 0.329 | 1.577 | 1.774 | 154 | 2 |
| 11 | 0 | 0.414 | 2.318 | 60 | 0.5 |
| 12 | 0 | 1.533 | 0.677 | 110 | 0.25 |
| 13 | 0 | 0.94 | 2.879 | 100 | 1.5 |

Urea Content: 0.94 mmol/g
OH Content: 2.879 mmol/g
Mass Fraction of Solids: 38.1%
Acid Number: 22.6 mg/g
pH: 7.2 (measured as detailed supra)

EXAMPLE 14

Coating Tests

Coating compositions were prepared from each of the dispersions of examples 3 to 13 according to the following recipe:
Part 1:
250 g of the dispersions of examples 3 to 13 each,
0.5 g of a levelling and substrate wetting agent based on a polyether modified polysiloxan (®Additol VXW 6503, Cytec Surface Specialties Austria GmbH)
0.5 g of a nonionic surfactant (®Surfynol 104, Air Products and Chemicals Inc.)
25 g of water to adjust the viscosity of the mixture of Part 1 to from 250 mPa·s to 350 mPa·s (measured at 23° C. and a shear rate of 100 s$^{-1}$)
Part 2:
70 g of a hydrophilically modified aliphatic polymeric isocyanate based on hexamethylene diisocyanate having a concentration of isocyanate groups (v. s.) of 17.4% (®Bayhydur 3100, Bayer Material Science AG)

Coating film properties were tested on films obtained by applying a wet film with a thickness of 200 μm to clean glass plates (rinsed with isopropanol and dried for thirty minutes at 80° C.), and forced drying of the coating films at 70° C. for twelve hours. The results of the application testing (hardness measured according to the procedure of König (DIN EN ISO 1522) and acetone resistance were recorded after letting the glass plates rest for twelve hours at ambient temperature.

It can be seen that the results for coating compositions based on the polyurethane dispersions according to the invention (3 to 8, 10, and 13), König hardness is more than 60 s, and acetone resistance is at least thirty seconds (0.5 min).

Improved results are shown by coating compositions where additionally, at least one parameter is in the preferred range (examples 3, 4, and 13), leading to hardness values at least 100 s, and acetone resistance of at least ninety seconds (1.5 min).

If all parameters are in the claimed ranges, and at least two are in the preferred range, hardness values in excess of 150 s, and acetone resistance of at least one hundred and twenty seconds (two minutes) have been recorded.

Particularly good results have been obtained for coating compositions where all parameters, degree of branching, specific amount of substance of urea groups, and specific amount of hydroxyl groups, are in the preferred range, as shown for coating compositions based on polyurethane dispersions of examples 7 and 8 leading to hardness values of more than 150 s, and acetone resistance of at least four minutes.

EXAMPLE 15

Solvent Resistance Test

A test formulation 15 was prepared by mixing 250 g of the polyurethane dispersion of Example 7 with 0.5 g of a polyether modified polysiloxane wetting agent, 0.5 g of a non-ionic defoamer and 50 g of deionised water to adjust the viscosity. Then, 95 g of a hydrophilic, aliphatic multifunctional isocyanate based on hexamethylene diisocyanate were added, and the mixture was stirred for ten minutes. A coating film of 200 μm wet film thickness was applied on a glass plate with a step gap film applicator and was allowed to flash off for ten minutes. Thereafter, the coating was cured for thirty minutes at 80° C. followed by a post-cure step treatment for twelve hours at 70° C. to complete curing.

The acetone resistance properties of the cooled film were tested by applying acetone onto the film covered with a beaker. Every thirty seconds the film was tested for softness and stickiness, and evaporated acetone was replenished if necessary. In this test the coating showed no softening under the influence of acetone within ninety minutes after which the test was discontinued.

In the Skydrol®-test (aviation hydraulic liquid, brand name of Solutia Inc.) a sample sheet (prepared as described above) was immersed in Skydrol® liquid at room temperature, and another sample sheet at 70° C. At room temperature, the cured film prepared with the test formulation as described supra was able to withstand three weeks until it became soft and sticky, at 70° C. the film resisted for ten days.

EXAMPLE 16

Suncream Resistance

Using the test formulation as described in Example 15, a coating film of 200 μm wet film thickness was applied on a plaque made from a commercial blend (Bayblend® T 85, Bayer) of polycarbonate (PC) and acrylonitrile-butadiene-styrene terpolymer (ABS) with a step gap film applicator and was allowed to flash off for ten minutes. Thereafter, the coating was cured for thirty minutes at 80° C. followed by a post-cure step treatment for twelve hours at 70° C. to complete curing.

A commonly used sunscreen test mixture was prepared by mixing 100 g each of octocrylene (2-ethylhexyl-2-cyano-3,3-diphenyl-2-propenoate), 2-ethyhexyl methoxycinnamate, and butylene glycol dicaprate/dicaprylate (mixed ester of 1,2-butanediol and a mixture of octanoic and decanoic acids).

The plaques were stored at 60° C. in a circulation hot air cabinet for forty-eight hours. After cooling to ambient temperature (20° C. to 25° C.), an area of 20 mm×20 mm was covered with a layer of sunscreen test mixture of 1 mm. After resting at ambient temperature for thirty minutes, the test plaques were stored in a circulating hot air cabinet for twenty-four hours at 60° C. The plaques were taken out, left for one hour at ambient temperature to cool, and the surface was then cleaned at ambient temperature with an aqueous detergent solution (1 g of household dish washing detergent and 99 g of deionised water) and wiped to dry. The treated part of the surface was tested visually, and with the cross-hatch test according to DIN EN ISO 2409. No change in appearance was detected, and the crosshatch test result was Gt 0 to Gt 1, as in the untreated portions of the plaques.

Comparative tests were done with test formulations made with the polyurethane dispersions of examples 9, 11, and 12. All three formulations failed in this test, but formulations from the polyurethane dispersions 11 and 12 did not show any changes in appearance and cross-hatch test when the suncream was left upon the coated plaques at room temperature for forty-eight hours.

EXAMPLE 17

Degree of Crosslinking

Test formulations 17-1 through 17-6 were prepared as follows: 250 g of the polyurethane dispersion of Example 7 were mixed with 0.5 g of a polyether modified polysiloxane wetting agent, 0.5 g of a non-ionic defoamer and 50 g of deionised water to adjust the viscosity. Then, different amounts of a crosslinking agent, viz. a hydrophilic, aliphatic multifunctional isocyanate based on hexamethylene diisocyanate, were added, and the mixture was stirred for ten minutes. A 200 μm wet film was applied on a glass plate with a step gap film applicator and was allowed to flash off for ten minutes. Then, the coating was cured for thirty minutes at 80° C. followed by a post-cure step of one day, or of one week at ambient temperature to complete curing.

The following table 2 shows the influence of amount of crosslinking agent on the pendulum hardness (according to König) and acetone resistance. The pendulum hardness was tested according to DIN EN ISO 1522. Acetone resistance was determined as described supra. In mixture 17-4, the amount of crosslinking agent was chosen such that the amount of substance of isocyanate groups in the crosslinking agent was the same (=100%) as the amount of substance of hydroxyl groups in the polyurethane dispersion. In the other formulations, the amount of crosslinking agent was chosen such that the ratio of the amount of substance of isocyanate groups in the crosslinking agent to the amount of substance of hydroxyl groups in the polyurethane dispersion corresponded to the stoichiometric ratio as stated in the second column.

TABLE 2

Effect of Crosslinking Stoichiometry

| | Crosslinking (stoichiometric ratio) | Pendulum hardness | Acetone resistance |
|---|---|---|---|
| 17-1 | 0% | 87 s | 0 min |
| 17-2 | 60% | 161 s | 2 min |
| 17-3 | 80% | 168 s | 8 min |
| 17-4 | 100% | 168 s | 9 min |
| 17-5 | 120% | 166 s | 10 min |
| 17-6 | 140% | 165 s | >10 min |

Stoichiometric ratio is the ratio of the amount of substance of isocyanate groups in the cross-linking agent added, divided by the amount of substance of hydroxyl groups in the dispersed polyurethane, where 100% means a ratio of 1. As shown in table 2, the polyurethane dispersion of example 7 shows already very high chemical resistance properties even if the material is undercured (80% stoichiometric ratio).

In comparison, the same pendulum hardness and acetone resistance tests were performed with the polyurethane dispersions of example 9 (low hydroxyl group-content and low urea-content, no branching), example 13 (high hydroxyl group-content, medium urea content, no branching) and example 11 (middle urea-content, low OH-group content, no branching) at a crosslinking degree of 140%. The pendulum hardness was tested according to DIN EN ISO 1522. Acetone resistance was determined as described supra. The results are summarised in table 3:

TABLE 3

| | Pendulum hardness | Acetone resistance |
|---|---|---|
| PUD - Ex. 9 | 61 s | 0.5 min |
| PUD - Ex. 13 | 159 s | 4.5 min |
| PUD - Ex. 11 | 89 s | 1 min |

It can be seen that the simultaneous presence of all preferred characteristics leads to the best performance.

The polyurethanes of this invention also have exceptionally high gloss and a unique combination of hardness and flexibility. This is shown by the following two examples.

EXAMPLE 18

Gloss

Test formulation 18 was prepared by mixing 36 g of the polyurethane dispersion of example 8 was mixed with 12 g of a water based polyester resin (®Resydrol 6618w/42WA, commercial grade of oil-free polyester from Cytec Austria GmbH), 24 g of deionised water, 0.25 g of a polyether modified polysiloxane wetting agent, 0.25 g of a silicone modified levelling agent, 0.7 g of non-ionic defoamer, 5.0 g of co-solvent (ethyl alcohol) and 2.5 g of a water based carbon black pigment formulation (®Printex, commercial grade from Evonik Industries). Then, 20 g of a hydrophilic, aliphatic polyfunctional isocyanate based on hexamethylene diisocyanate was added, and the mixture was stirred for ten minutes. A coating film of 200 μm wet thickness was applied onto an ABS polymer plaque with a step gap film applicator, and was allowed to flash off for ten minutes. The coating was cured for thirty minutes at 80° C. followed by a post-cure step of 12 hours at 70° C.

After cooling to ambient temperature, gloss was measured with a Byk-Gardner micro gloss unit according to DIN EN ISO 2813. The gloss of this coating measured at an angle of 20° angle was 87.

EXAMPLE 19

Bending Test

Despite their high hardness, coating films prepared with the polyurethane dispersions according to the present invention have high flexibility. This is demonstrated by this example. Formulation 19 was prepared by mixing 250 g of the polyurethane dispersion of example 8, 0.5 g of a polyether modified polysiloxane wetting agent, 0.5 g of a non-ionic defoamer, and 50 g of deionised water to adjust the viscosity. 95 g of a hydrophilic, aliphatic polyisocyanate based on hexamethylendiisocyanat were then added, and the mixture thus obtained was stirred for ten minutes. A coating film having a wet thickness of 200 μm was applied on a soft PVC sheet with a step gap film applicator and was allowed to flash off for ten minutes. The coating was then cured for thirty minutes at 80° C., followed by a post-cure step of twelve hours at 70° C. to complete curing.

The coated PVC sheet was cooled to ambient temperature and was bent over a steel panel in an angle of 180°. Upon visual inspection, no cracks or loss of adhesion could be found in the coating film.

EXAMPLE 20

Anti-Graffiti Properties

Test formulation 20 was prepared by mixing 250 g of the polyurethane dispersion of example 7 with 0.5 g of a polyether modified polysiloxane wetting agent, 0.5 g of a non-ionic defoamer, and 50 g of deionised water to adjust the viscosity. Afterwards, 30.1 g of an aqueous solution of a methylated high imino melamine resin (Cymel® 328, Cytec Industries, 85% strength in water, stoichiometric ratio of melamine to formaldehyde to methanol of 1 mol:4.3 mol:3.2 mol) was added, and the mixture was stirred for ten minutes. A coating film of 24 μm wet thickness was applied on a soft PVC sheet with a bar coater and was allowed to flash off for 10 minutes. The coating film was then cured for twenty minutes at 140° C. After cooling to ambient temperature, the coating film was subjected to the graffiti test according to ASTM D6578: several lines with a solvent containing red and black text marker were applied onto the cured coating film, and five minutes later, the marker lines were removed with a cotton sheet soaked in acetone. The marker lines were fully removed leaving no visible traces, and the surface of the coating film was not attacked by the solvent.

EXAMPLE 21

Resistance to UV Irradiation with No Added UV Stabiliser

Test formulation 21 was prepared by mixing 750 g of the polyurethane dispersion of example 8 with 10.5 g of a non-ionic polymeric dispersing additive and 366 g of $TiO_2$ pigment. After sixty minutes of grinding on a pearl mill, 57.5 g of ethanol, 50 g of deionised water, 3 g of a polyether modified polysiloxane wetting agent, 3 g of a modified silicone levelling agent and 5 g of a non-ionic defoamer were added. 222 g of a hydrophilic, aliphatic polyisocyanate based on hexamethylene diisocyanate were then added, and the resulting mixture was stirred for ten minutes. A coating film of 200 μm wet thickness was applied onto a hard PVC sheet with a step gap film applicator and was allowed to flash off for ten minutes. The coating was cured for thirty minutes at 80° C. followed by a post-cure step of twelve hours at 70° C. to complete curing.

The coated PVC sheets were subjected to an UVCON test with a QUV accelerated weather tester (Q-labs) with UV-B 313 radiation, eight hours of UV exposure followed by four hours condensation phase at 60° C. The measured yellowing Δb* (on the CIELab scale) after 4900 hours was 2.0. No chalking of the surface was observed. The test was conducted in accordance with DIN EN ISO 11507, DIN 67530, DIN EN ISO 46828-2 and 4628-6.

It can be seen that the coating itself has a sufficient stability against UV irradiation.

EXAMPLE 22

A mixture of 367.9 g of a polycarbonate diol based on 1,6-hexane diol (OH number 110 mg/g; commercially available as Desmophen® XP 2586, Bayer Material Science AG), 100.5 g of 2,2-dimethylolpropionic acid, 39.8 g of 1,6-hexane diol and 30.2 g of trimethylolpropane were heated to 60° C. with stirring. A mixture of 610 g of m-tetramethylxylylene diisocyanate and 100.5 g of isophorone diisocyanate was added and the resulting mixture was stirred and heated to 120° C. At that temperature, the reaction was continued until the mass fraction of remaining isocyanate groups in the reaction mixture was less than 9.5%. The prepolymer was cooled to 90° C., and a mixture of 256.5 g of diethanolamine, 53.4 g of N,N-dimethylethanolamine and 1800 g distilled water was added. This mixture was stirred for five minutes. Immediately thereafter, a mixture of 7.5 g of 1,5-methylpentane diamine and 500 g of distilled water was added, and the resulting mixture was stirred at 60° C. for one hour. The following parameters were determined on this dispersion:
Urea content: 1.638 mmol/g
OH content: 3.191 mmol/g
Branching 0.147 mmol/g
mass fraction of solids: 40.5%
Acid number: 25.6 mg/g
pH: 7.6 (measured as detailed supra)

EXAMPLE 23

A mixture of 367.9 g of the polyester A of example 1, 100.5 g of 2,2-dimethylolpropionic acid, 59.7 g of 1,6-hexane diol and 15 g of trimethylolpropane were heated to 60° C. with stirring. A mixture of 610 g of m-tetramethylxylylene diisocyanate and 100.5 g of isophorone diisocyanate were added and the resulting mixture was stirred and heated to 120° C. At that temperature, the reaction was continued until the mass fraction of isocyanate groups in the reaction mixture was less than 9.2%. The prepolymer was cooled to 90° C., and a mixture of 256.5 g of diethanolamine, 53.4 g of N,N-dimethylethanolamine and 1800 g of distilled water were added. This mixture were stirred for five minutes. Immediately thereafter, a mixture of 7.5 g of 1,5-methylpentane diamine and 500 g of distilled water was added, and the resulting mixture was stirred at 60° C. for one hour. The following parameters were determined on this dispersion:
Urea content: 1.592 mmol/g
OH content: 3.101 mmol/g
Branching: 0.071 mmol/g
mass fraction of solids: 40.2%
Acid Number: 27.6 mg/g
pH: 7.3 (measured as detailed supra)

EXAMPLE 24

A mixture of 367.9 g of the polyester A of example 1, 100.5 g of 2,2-dimethylol propionic acid and 41.6 g of glycerol was heated to 60° C. with stirring. 783.2 g of m-tetramethylxylylene diisocyanate were added and the resulting mixture was stirred and heated to 120° C. At that temperature, the reaction was continued until the mass fraction of isocyanate groups in the reaction mixture was less than 9.2%. The prepolymer was cooled to 90° C., and 256.5 g of diethanolamine were added, followed by 53.4 g of N,N-dimethylethanolamine, and the mixture was stirred for thirty minutes. Immediately thereafter, the reaction mass was dispersed with 2300 g of distilled water at 80° C. and stirred for one hour. The following parameters were determined on this dispersion:
Urea content: 1.645 mmol/g
OH content: 3.290 mmol/g
Branching: 0.289 mmol/g
mass fraction of solids: 40.2%
Acid Number: 27.6 mg/g
pH: 7.3 (measured as detailed supra)

The results obtained with these dispersions are compiled in table 4.

TABLE 4

Test results

| Polyurethane Dispersion of Example | Degree of branching (calculated) in mol/kg | specific amount of substance of urea groups in mol/kg | specific amount of substance of hydroxyl groups in mol/kg | König Hardness in s | Acetone Resistance in min |
|---|---|---|---|---|---|
| 22 | 0.147 | 1.63 | 3.19 | 170 | 3.5 |
| 23 | 0.071 | 1.59 | 3.1 | 175 | 3 |
| 24 | 0.29 | 1.64 | 3.29 | 175 | 5 |

It can be seen from these additional dispersion examples that a degree of branching of at least 0.05 mol/kg (equivalent to 0.05 mmol/g), particularly in combination with a high hydroxyl group content of at least 3 mol/kg is favourable to obtaining good solvent resistance and hardness properties.

The invention claimed is:
1. An aqueous dispersion comprising an aqueously dispersible polyurethane having a specific amount of substance of hydroxyl groups, —OH, of from 1 mol/kg to 4 mol/kg, and a specific amount of tertiary and/or quaternary aliphatic carbon atoms of from 0.01 mol/kg to 0.5 mol/kg, wherein the tertiary and quaternary carbon atoms are derived from tri- and tetravalent alcohols selected from the group consisting of trimethylolethane, trimethylolpropane, trimethylol butane, ditrimethylolethane, ditrimethylolpropane, ditrimethylolbutane, and pentaerythritol, and a specific amount of urea groups >N—CO—N< of from 0.8 mol/kg to 1.7 mol/kg, wherein in each case the specific amount of substance is based on the mass of the polyurethane, said branched aqueously dispersible polyurethane further having a specific amount of substance of acid and/or acid anion groups of from 0.1 mol/kg to 1.8 mol/kg or a specific amount of substance of basic and/or cationic groups of from 0.1 mol/kg to 1.8 mol/kg, and/or a mass fraction of oligo-oxyethylene groups of from 1% to 25%, wherein oligooxyethylene groups obey the formula —O—(—CH$_2$—CH$_2$—O—)$_n$—CH$_2$—CH$_2$—O—, wherein n is from 1 to 100, obtained by a process comprising the steps of
(1) preparing an aqueously dispersible branched polyurethane by
(a)—preparing a hydroxy-functional polymer A having a number average molar mass of at least 400 g/mol, and at least two hydroxyl groups per molecule,
(b)—mixing polymer A with a polyhydric organic compound A' having at least three hydroxyl groups per molecule, and a molar mass of not more than 500 g/mol, selected from the group consisting of trimethylolethane, trimethylolpropane, trimethylol butane, ditrimethylolethane, ditrimethylolpropane, ditrimethylolbutane, and pentaerythritol, and with either or both of
an acid B1 which is an hydroxy-functional or amino-functional acid having at least one hydroxyl or primary or secondary amino group and at least one acid group, and
a polyether B2 which has oligo-oxyethylene groups obeying the formula II

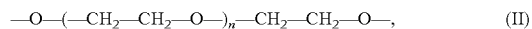

—O—(—CH$_2$—CH$_2$—O—)$_n$—CH$_2$—CH$_2$—O—, (II)

wherein n is from 1 to 100, and at least one hydroxyl group, or with either or both of a basic compound B3 which is a hydroxy-functional or amino-functional basic compound having at least one hydroxyl or primary or secondary amino group and at least one basic group which is optionally a tertiary amino group, and a polyether B2 which has oligo-oxyethylene groups obeying the formula II —O—(—CH$_2$—CH$_2$—O—)$_n$—CH$_2$—CH$_2$—O—,  (II)

wherein n is from 1 to 100, and at least one hydroxyl group, (c)—reacting the mixture prepared in step (b) with at least one polyfunctional isocyanate C having at least two isocyanate groups per molecule, wherein the amount of isocyanate C is chosen such that there is a ratio of isocyanate groups in component C to hydroxyl groups present in the mixture prepared in step (b) of from 2:1 to 1.1:1, until at least 90% of the hydroxyl groups of the mixture prepared in step (b) are consumed by reaction with the isocyanate component C, (d)—adding to the reaction product of step (c) at least one of a hydroxyamine D having at least one primary or secondary amino group, and at least one hydroxyl group, a polyhydric alcohol E having at least two hydroxyl groups per molecule, and a polyfunctional amine F having at least two amino groups, each of the amino groups being selected from primary and secondary amino groups, in order to obtain an aqueously dispersible branched polyurethane, and (2)—dispersing the aqueously dispersible branched polyurethane obtained in step (d) in water, and optionally adding a chain extender G.

2. The aqueous dispersion of claim 1 wherein the specific amount of substance of tertiary and/or quaternary aliphatic carbon atoms is from 0.1 mol/kg to 0.4 mol/kg.

3. The aqueous dispersion of claim 1, wherein the polyurethane has a specific amount of substance of acid and/or acid anion groups of from 0.1 mol/kg to 1.8 mol/kg.

4. The aqueous dispersion of claim 1, wherein the polyurethane has a mass fraction of oligo-oxyethylene groups of from 1% to 25%, wherein oligo-oxyethylene groups obey the formula —O—(—CH$_2$—CH$_2$—O—)$_n$—CH$_2$—CH$_2$—O—, wherein n is from 1 to 100.

5. The aqueous dispersion of claim 1, wherein the polyurethane has a specific amount of substance of basic and/or cationic groups of from 0.1 mol/kg to 1.8 mol/kg.

6. The aqueous dispersion of claim 1, wherein the branched aqueously dispersible polyurethane has a degree of branching of at least 0.2 mol/kg.

7. The aqueous dispersion of claim 1, wherein the tri- and tetravalent alcohols are selected from trimethylolethane, trimethylol propane, trimethylol butane, and pentaerythritol.

8. The aqueous dispersion of claim 1 wherein the polyhydric organic compounds A' having at least three hydroxyl groups per molecule, and a molar mass of not more than 500 g/mol are tri- and tetravalent alcohols selected from trimethylolethane, trimethylol propane, trimethylol butane, and pentaerythritol.

9. A process for the preparation of the aqueous dispersion of claim 1, comprising the steps of (1) preparing an aqueously dispersible branched polyurethane by (a)—preparing a hydroxy-functional polymer A having a number average molar mass of at least 400 g/mol, and at least two hydroxyl groups per molecule, (b)—mixing polymer A with a polyhydric organic compound A' having at least three hydroxyl groups per molecule, and a molar mass of not more than 500 g/mol, selected from the group consisting of trimethylolethane, trimethylolpropane, trimethylol butane, ditrimethylolethane, ditrimethylolpropane, ditrimethylolbutane, and pentaerythritol, and with at least one of an acid B1 which is an hydroxy-functional or amino-functional acid having at least one hydroxyl or primary or secondary amino groups and at least one acid group, and a polyether B2 which has oligo-oxyethylene groups obeying the formula II —O—(—CH$_2$—CH$_2$—O—)$_n$—CH$_2$—CH$_2$—O—,  (II)

wherein n is from 1 to 100, and at least one hydroxyl groups, or with at least one of a basic compound B3 which is a hydroxyl-functional or amino-functional basic compound having at least one hydroxyl or primary or secondary amino group and at least one basic group, and a polyether B2 which has oligo-oxyethylene groups obeying the formula II —O—(—CH$_2$—CH$_2$—O—)$_n$—CH$_2$—CH$_2$—O—,  (II)

wherein n is from 1 to 100, and at least one hydroxyl group, (c)—reacting the mixture prepared in step (b) with at least one polyfunctional isocyanate C having at least two isocyanate groups per molecule, wherein the amount of isocyanate C is chosen such that there is a ratio of isocyanate groups in component C to hydroxyl groups present in the mixture prepared in step (b) of from 2:1 to 1.1:1, until at least 90% of the hydroxyl groups of the mixture prepared in step (b) are consumed by reaction with the isocyanate component C, (d)—adding to the reaction product of step (c) at least one of a hydroxyamine D having at least one primary or secondary amino group, and at least one hydroxyl group, a polyhydric alcohol E having at least two hydroxyl groups per molecule, and a polyfunctional amine F having at least two amino groups, each of the amino groups being selected from primary and secondary amino groups, in order to obtain an aqueously dispersible branched polyurethane, and, (2)—dispersing the aqueously dispersible branched polyurethane obtained in step (d) in water, and optionally adding a chain extender G.

10. The process of claim 9 wherein a hydroxy-functional acid B1 is used in step (b), and wherein in step 2, the reaction product of step (d) is neutralised before or during or after dispersing in water by adding an alkaline reagent selected from alkali hydroxides, earth alkali hydroxides, amines, ammonium hydroxide and alkylated ammonium hydroxide.

11. The process of claim 9 wherein the isocyanate concentration of the reaction product of step (c) is at least 5%.

12. A method of use of the aqueous dispersion of claim 1 for the preparation of coating compositions, comprising the steps of admixing to the aqueously dispersible polyurethane at least one additive selected from the group of wetting agents, defoamers, antisettling agents, levelling agents, biocides, and coalescing agents, optionally pigments and colourants, to form a binder mixture, combining the binder mixture thus prepared with at least one crosslinking agent selected from the group consisting of capped and uncapped isocyanates, hydrophilically capped and uncapped isocyanates, aminoplast crosslinkers, alkoxycarbonylamino triazines, and phenoplast resins, and applying the mixture of binder and crosslinking agent to a substrate by spraying, dipping, brushing, blade coating, curtain coating or roller coating, and drying the coated substrate optionally at elevated temperature to form a coating film on the said substrate.

13. The process of claim 9, wherein the polyether B2 has at least two hydroxyl groups.

14. The process of claim 9, wherein the hydroxy-functional or amino-functional basic compound B3 has at least two hydroxyl or primary or secondary amino groups and at least one basic group which is a tertiary amino group.

15. The process of claim 9, wherein the hydroxyl-functional acid B1 comprises two hydroxyl groups or primary or secondary amino groups.

\* \* \* \* \*